United States Patent [19]

Grace

[11] 4,214,780
[45] Jul. 29, 1980

[54] ROTATABLE PIPE COUPLING STRUCTURE

[76] Inventor: George A. Grace, 35 Greenbrae Circuit, Apt. 103, Scarborough, Ontario, Canada, M1H 1P8

[21] Appl. No.: 828,007

[22] Filed: Aug. 25, 1977

[30] Foreign Application Priority Data

May 20, 1977 [CA] Canada ................................ 278932

[51] Int. Cl.² ............................................ F16L 39/04
[52] U.S. Cl. ..................................... 285/134; 285/336
[58] Field of Search ............... 285/136, 134, 273, 331, 285/336, 353, 168; 9/8 P

[56] References Cited

U.S. PATENT DOCUMENTS

| 3,648,311 | 3/1972 | Voss | 285/134 X |
| 3,684,316 | 8/1972 | Lavender | 285/134 X |

FOREIGN PATENT DOCUMENTS

| 6401329 | 9/1964 | Netherlands | 285/336 |
| 211708 | 10/1940 | Switzerland | 285/331 |
| 485885 | 5/1938 | United Kingdom | 285/168 |
| 638078 | 5/1950 | United Kingdom | 285/134 |

Primary Examiner—Werner H. Schroeder
Attorney, Agent, or Firm—Ladas & Parry

[57] ABSTRACT

The specification describes a rotatable multiple pipe coupling structure employing a labyrinth seal between each stationary pipe and its respective rotatable pipe. Because of no protruding parts from inner pipes into the channels, there will be minimized turbulence in the fluids to be transferred through the rotatable multiple pipe coupling structure. There is also described a rotatable pipe coupling structure having a stationary pipe and a corresponding rotatable pipe. The pipes are rotatably sealed with a labyrinth seal. The coupling structures according to this invention may be further provided with a driving shaft longitudinally and centrally extending therethrough. The coupling structures of this invention are applicable for a revolving floor such as tower restaurants, for changing the surface area of vehicle tires while in motion, for moving cranes, for remote handling of materials such as radio-active materials, for gun turrets, helicopters, heavy mining machinery, and wherever there is required to transfer at least one fluid from a stationary element to a rotatable element.

16 Claims, 5 Drawing Figures

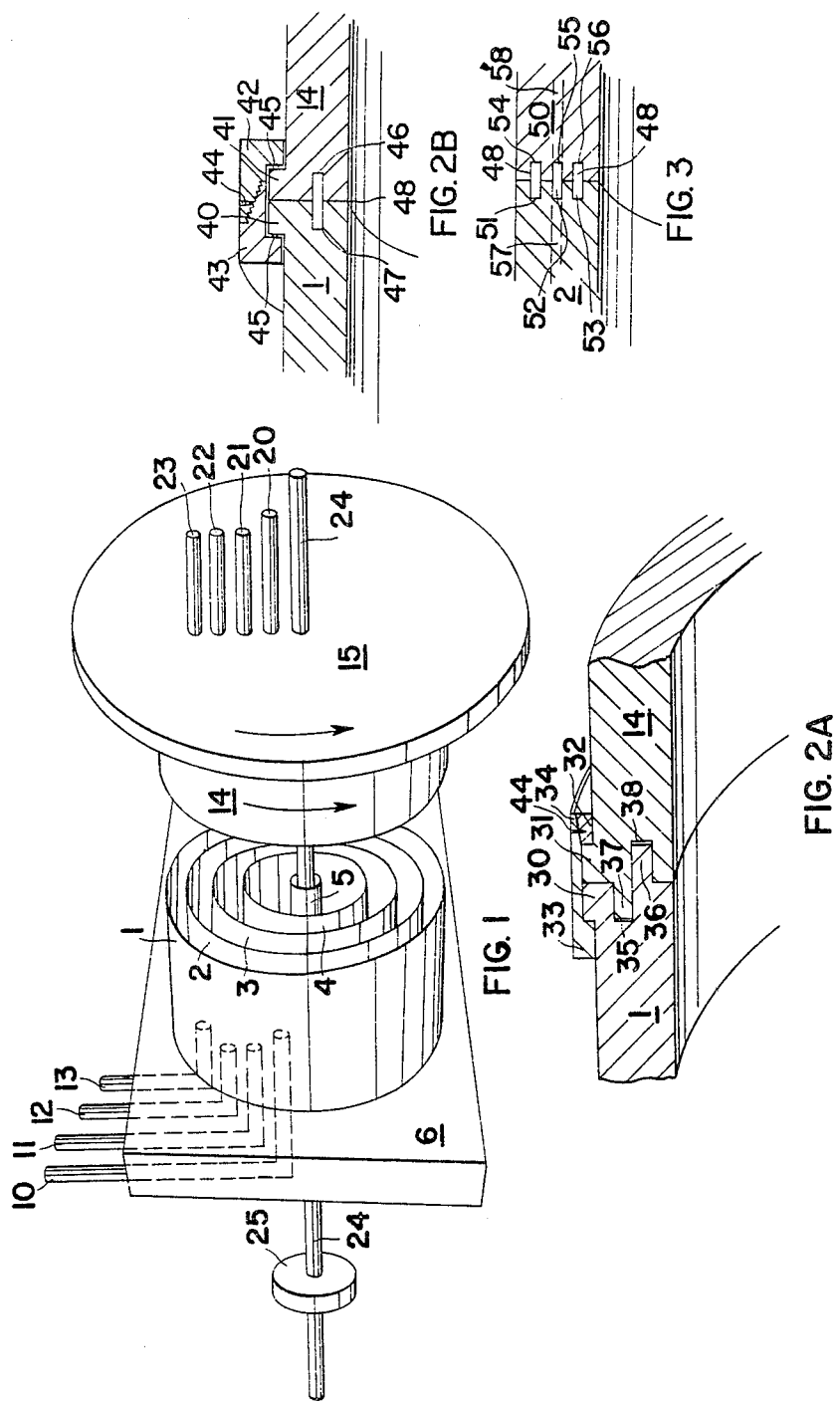

ROTATABLE PIPE COUPLING STRUCTURE

This invention relates to a pipe coupling structure and in particular to a rotatable pipe coupling structure adapted to transfer a fluid under pressure between a stationary conduit and a rotatable conduit. This invention also relates to a rotatable multiple pipe coupling structure adapted to separately transfer a plurality of fluid under pressure between stationary conduits and the corresponding rotatable conduits wherein each stationary conduit and the corresponding rotatable conduit are adapted for a different fluid.

There have been known many rotatable multiple pipe coupling structures. U.S. Pat. No. 464,707 issued on Dec. 8, 1891 to Burns discloses a cylinder-in-sleeve or telescoping tubular connector for a plurality of isolated fluids. U.S. Pat. No. 2,825,463 issued Mar. 4, 1958 to Thomas discloses another cylinder-in-sleeve type arrangement. U.S. Pat. No. 485,596 issued on Nov. 1, 1892 to Morgan discloses a concentric steam joint casing provided with a pair of concentric stationary chambers and matching concentric rotatable chambers. Each chamber is provided with an opening. Canadian Pat. No. 919,212 issued Jan. 16, 1973 to Maurer et al discloses a quick disconnect rotary joint comprising a pair of concentric cylindrical channels formed by an inner stationary cylinder and the combination of an outer stationary cylinder and an outer rotatable cylinder. The outer cylinders are detachably and rotatably connected together by extending the proximal end wall of the stationary outer cylinder over the proximal end wall of the rotatable outer cylinder, forming an annular recess in the outer surface of the end wall of the rotatable outer cylinder and a matching annular recess in the inner surface of thus extended end wall of the stationary outer cylinder and disposing an O-ring within the cavity formed by the recesses.

The rotatable multiple coupling according to each of the Burns, Thomas and Morgan patents includes highly complicated flow paths for liquids to be transferred between the stationary conduits and their corresponding rotatable conduits. Such flow paths are considered to be undesirable for transferring fluids therethrough because they cause considerable turbulence of the fluids therein. This drawback becomes more apparent when fluids are transferred under pressure. Such turbulence will result in reduction of flowing velocity which may be compensated for by increasing the pressure. However, as easily envisaged, it is necessary to employ a rotatable seal with a very high sealing ability for such highly-pressurized fluid which can be a very real problem. The rotatable multiple coupling of the Morgan patent, furthermore, is limited to oscillation and does not permit full rotation. The quick disconnect rotary joint of the Maurer patent also uses complicated flow paths, especially for the outer conduit. The rotatable seal of the Maurer patent may be useable for an outermost stationary pipe and its corresponding outermost rotatable pipe. However, it is inadequate to use for an inner stationary pipe and its corresponding inner rotatable pipe as the seal has some elements projecting from the outer surfaces of the pipes at the place where they meet. Such projection causes undesired turbulence in the fluid being transferred therealong.

The object of this invention is to provide a rotatable pipe coupled structure adapted to transfer a fluid under pressure between a stationary conduit and a rotatable conduit, while minimizing undesired turbulence of the fluid.

Another object of this invention is to provide a rotatable multiple pipe coupling structure adapted to separately transfer a plurality of fluid under pressure between stationary conduits and the corresponding rotatable conduits, while minimizing undesired turbulence of fluid.

A further object of this invention is to provide a rotatable multiple coupling structure as described above employing labyrinth seals.

Still further object of this invention is to provide a rotatable multiple pipe coupling structure as described above having means for driving the rotatable element to which said rotatable conduits are secured.

Such a rotatable multiple pipe coupling structure with a driving shaft about which a plurality of pipes are concentrically provided may be applied, for example, for a revolving floor such as tower restaurants, for changing the surface area of vehicle tires while in motion, for moving cranes, for remote handling of materials such as radio-active materials, for gun turrets; helicopters, heavy mining machinery, and wherever there is required to transfer at least one fluid from a stationary element to a rotatable element.

In one aspect of this invention there is provided a rotatable pipe coupling structure adapted to transfer a fluid between a stationary conduit and a rotatable conduit, comprising a combination of a stationary pipe and a rotatable pipe rotatably sealed together at the proximal end surfaces thereof by means of a labyrinth seal, said pipes being rotatably coupled at the proximal wall surfaces thereof with an annular hugger ring.

In another aspect of the invention there is provided a rotatable multiple pipe coupling structure separately comprising a combination of a stationary outer pipe and a rotatable outer pipe rotatably sealed together at the proximal end surface thereof by means of a labyrinth seal, said outer pipes being rotatably coupled at the proximal end wall surfaces thereof with an annular hugger ring; at least one combination of a stationary inner pipe and a rotatable inner pipe rotatably sealed together at the proximal end surfaces thereof by forming at least one annular groove in the proximal end surface of one of the inner pipes and a matching annular groove in the proximal end surface of the other inner pipe and by slidably disposing an annular sealing ring within the annular cavity formed with the grooves; said stationary outer and inner pipes being secured with a stationary wall at the distal ends thereof and the rotatable outer and inner pipes being secured at the distal ends thereof with a rotatable wall; and the stationary and rotatable walls being provided therethrough with at least one opening communicating with each of the passages formed with the pipes.

In still another aspect of this invention, there is provided such a rotatable multiple pipe coupling structure as described above wherein the structure further comprises a pair of shaft openings. Each of the shaft openings is provided through each of the stationary and rotatable walls. The pair of shaft openings communicate with an innermost passage formed within the innermost stationary and rotatable pipes. The structure is further provided with a shaft extending through the innermost passage and the pair of shaft openings. The shaft is adapted to rotate the rotatable pipes, wall and conduits. In a preferred embodiment, the rotatable wall is mounted on a chassis in such a manner that any shock which may be exerted onto the rotatable element may be transmitted therebetween via the shaft and the chassis without exerting stress onto the rotatable sealing structure.

The advantages derived from the present invention are numerous. The outer stationary pipe and the outer rotatable pipe are rotatably sealed by the labyrinth seals and they are further rotatably coupled with a hugger ring. The inner stationary pipes and the corresponding inner rotatable pipes are also rotatably sealed together by forming a rather complicated and longer path between the proximal ends of the pipes. Because no part protrudes from the proximal ends of the pipes, there is substantially eliminated undesired turbulence of fluid at the place where both the stationary and rotatable pipes are rotatably sealed.

The invention is illustrated by way of example in the accompanying drawings wherein:

FIG. 1 is a diagrammatic perspective view of an embodiment of the rotatable multiple coupling structure according to this invention wherein the stationary and rotatable pipes are disconnected.

FIG. 2A is a partial cross-sectional view showing in detail an embodiment of the sealing and coupling structure for the outer pipes of the rotatable multiple coupling structure in FIG. 1.

FIG. 2B is a partial cross-sectional view showing in detail another embodiment of the sealing and coupling structure for the outer pipes of the rotatable multiple coupling structure in FIG. 1.

FIG. 3 is a partial cross-sectional view showing in detail an embodiment of the sealing structure of a stationary inner pipe and the corresponding rotatable inner pipe of the rotatable multiple coupling structure in FIG. 1.

Figure 4:
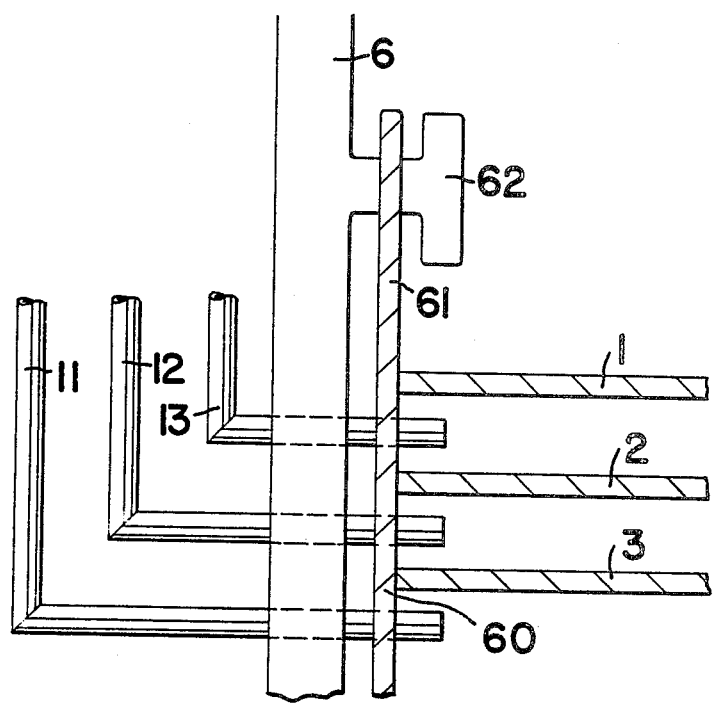
FIG. 4 is a partial cross-sectional view of the rotatable multiple coupling structure according to another embodiment of this invention wherein the stationary pipes are terminated in an end wall and are longitudinally, tolerably mounted the chassis.

In FIG. 1 concentric stationary pipes 1, 2, 3, 4, 5 are fixedly secured to the chassis 6. The pipe 1 is the stationary outer pipe and the other stationary pipes are inner pipes. The concentric separate channels formed by the concentric stationary channels communicate with the stationary conduits 10, 11, 12, 13. The rotatable outer pipe 14 encloses concentrically rotatable inner pipes (not shown) which engage the stationary inner pipes 2, 3, 4, 5 respectively. The concentric rotatable outer and inner pipes are secured to the rotatable wall 15 through which rotatable conduits 20, 21, 22, 23 are provided. The rotatable conduits respectively communicate with the concentric rotatable channels formed by the concentric rotatable inner and outer pipes. There is provided through the innermost pipes a shaft 24 which is adapted to be driven by the pulley 25. Instead of the pulley, a conventional force transmission mechanism can be used. For example, a ring gear may be fixedly secured about the shaft 24 and said ring gear can be driven by a pinion which is driven by any suitable driving means. Alternatively the shaft 24 may be driven by a motor mounted on the rotatable element including the rotatable pipes, rotatable conduits 20, 21, 22, 23 and rotatable end wall 15.

The stationary conduits and the rotatable conduits may respectively be used as supply conduits for fluid under pressure such as water and hydraulic fluid and as receiving conduits therefor. It is possible to employ more or less than four inner pipes as illustrated. It is also possible to employ one concentric channel for a fluid and the adjacent concentric channels as vent channels to prevent the fluid from being mixed with different fluids which are transferred through the adjacent channels. When fluids under pressure are transferred through the rotatable multiple coupling structure, the vent channels may be filled with a pressurized fluid which is inert to the fluids to be transferred.

In FIGS. 2A and 2B, there are shown coupling and sealing structures for the outer stationary pipe 1 and the outer rotatable pipe 14. In the structure shown in FIG. 2A, the proximal end walls of both outer pipes are provided with annular collars 30, 31. A male hugger ring 32 is secured to the outer wall of the outer rotatable pipe, adjacent to the distal wall of the collar 31. A female hugger ring 33 is rotatably provided over the collar 30 and is engaged with the male hugger ring 32. The hugger rings 32, 33 are secured together by means of a lock screw 34. The proximal end surface of the stationary outer pipe is precision-worked to provide an annular groove 35 and a concentric annular tooth 36. The proximal end surface of the rotatable outer pipe is also precision-worked to form an annular tooth 37 and a concentric annular groove 38 which rotatably and sealingly engage the groove 35 and the tooth 36 of the stationary outer pipe, thereby forming a labyrinth seal between the outer pipes. When a highly pressurized fluid is transferred through the channel formed by the outer pipes and the adjacent inner pipes, the sealing tends to open. This will, however, be compensated by the hugger ring structure as the sealing between the hugger ring 33 and the collar 30 at the distal wall of the collar 30 will be enhanced. Another type of sealing and coupling structure for the outer stationary and rotatable pipes is illustrated in FIG. 2B. As in the embodiment of FIG. 2A, the proximal end walls of both outer pipes are provided with annular collars 40 and 41. A female hugger ring 42 and a male hugger ring 43 are engaged together and secured together by means of a lock screw 44. The hugger rings rotatably embrace the collars 40 and 41. There are provided a pair of spring-loaded ball bearing rings 45, 45 between the collars and the hugger rings at the distal wall of each of the collars. The proximal end of the rotatable outer pipe 14 is provided with an annular groove 46 and a matching annular concentric groove 47 is formed in the proximal end of the stationary outer pipe 1. Both grooves 46, 47 form an annular cavity within which a sealing ring 48 is slidably disposed.

In FIG. 3, there is illustrated a sealing structure for the stationary inner pipe 2 and the corresponding rotatable inner pipe 50. The same structures can be used for the other stationary inner pipes 3, 4, 5 and the corresponding rotatable inner pipes. The proximal end of the stationary inner pipe 2 is provided with three spaced concentric annular grooves 51, 52, 53 which respectively correspond to the matching grooves 54, 55, 56 in the proximal end of the rotatable inner pipe 50. The grooves 51, 54 form an outermost annular cavity within which a sealing ring 48 is slidably disposed. The grooves 53, 56 form an innermost annular cavity within which a sealing ring 48 is slidably disposed. The central annular cavity formed by the grooves 52 and 55 may be used as a collector recess which communicates through vent channels 57 and 58 with a vent opening provided through each of the chassis 6 and the rotatable wall 15, where any leakage is either recovered or discarded.

When a high degree of sealing is not required, it may be possible to employ only one groove in each of the proximal ends of the inner pipes 2, 50. On the other hand, when an extremely high degree of sealing is required, it is preferred to employ more than two sealing rings, and each adjacent two rings having a collector recess therebetween. It may be preferred to have a small amount of leakage into each sealing arrangement as such leakage may serve as lubricant for the sealing arrangement.

Referring to FIG. 4, the stationary pipes are terminated in a stationary end wall 60. The stationary end wall 60 is provided with at least two claws 61 extending outwardly from the peripheral edge of the end wall 61. The claws 61 engage their respective posts 62 which extend perpendicularly from the chassis 6. Each claw and its respective post must have longitudinal tolerance greater than that between a main bearing of the shaft (not shown) and the chassis 6, thereby allowing any shock to the rotary element which is rigidly fastened to the shaft to be transmitted to the chassis via the shaft and main bearing without exerting stress onto the coupling arrangement between the stationary pipes and the rotatable pipes. The same arrangement may be used for the rotatable pipes.

The stationary pipes and rotatable pipes of the present invention may be made from cast iron or forged steel depending upon pressures of the fluids to be transferred and heat to be generated. Such cast iron or forged steel must pertain a very small co-efficient of expansion against pressure and/or temperature. Furthermore, design of sealing arrangement must be determined not only from the viewpoint of rotatable sealing but also from the viewpoint of heat and/or pressure expansion or shrinkage of the sealing arrangement. It is also obvious that any additional sealing and/or lubricating elements can be employed in conjunction with the hugger ring and the labyrinth seals.

What is claimed is:

1. A rotatable multiple pipe coupling structure comprising a combination of a stationary outer pipe and a rotatable outer pipe rotatably sealed together at the proximal end surfaces thereof by means of a labyrinth seal, said outer pipes being rotatably coupled at the proximal outer end wall surfaces thereof with an annular hugger ring; at least one combination of a stationary inner pipe and a rotatable inner pipe rotatably sealed together at the proximal end surfaces thereof by forming at least one annular groove in the proximal end surface of one of the inner pipes and a matching annular groove in the proximal end surface of the other inner pipe and by slidably disposing an annular sealing ring within the annular cavity formed with the grooves, the combination of the stationary inner pipe and the rotatable inner pipe having a uniform transverse cross-section over the whole longitudinal length of the combination; said stationary outer and inner pipes being secured with a stationary wall at the distal ends thereof and the rotatable outer and inner pipes being secured at the distal ends thereof with a rotatable wall; and the stationary and rotatable walls being provided therethrough with at least one opening communicating with each of the passages formed with the pipes.

2. The rotatable multiple pipe coupling structure as claimed in claim 1, wherein said labyrinth seal is formed by at least one annular tooth concentrically provided in the proximal end surface of one of the outer pipes and a matching concentric annular groove provided in the proximal end surface of the other outer pipe.

3. The rotatable multiple pipe coupling structure as claimed in claim 1, wherein said labyrinth seal is formed by at least one annular tooth and at least one annular groove concentrically provided in the proximal end surface of one of the outer pipes and a matching concentric annular groove and tooth provided in the proximal end surface of the other outer pipe.

4. The rotatable multiple pipe coupling structure as claimed in claim 1, wherein said labyrinth seal is formed by at least one annular groove provided in the proximal end surface of one of the outer pipes and a matching annular groove provided in the proximal end surface of the other outer pipe and by an annular sealing ring disposed within the annular cavity formed by the grooves.

5. The rotatable multiple pipe coupling structure as claimed in claim 1, wherein each of said outer pipes is provided at the proximal outer end wall surface with a collar radially protruding from the wall surface; said hugger ring comprises a male hugger ring and a matching female hugger ring; and said hugger ring slidably encloses the collars thereby coupling the outer pipes together.

6. The rotatable multiple pipe coupling structure as claimed in claim 5, further comprising at least a pair of spring loaded ball bearing rings, each ring being disposed between the hugger ring and each of the collars.

7. The rotatable multiple pipe coupling structure as claimed in claim 1, further comprising a pair of shaft openings, each being provided through each of the stationary and rotatable walls, said pair of openings communicating with an innermost passage formed with the innermost stationary and rotatable pipes; and a shaft extending through the innermost passage and the pair of shaft openings, said shaft being adapted to rotate a rotation element including the rotatable pipes and wall.

8. The rotatable multiple pipe coupling structure as claimed in claim 3, further comprising a pair of shaft openings, each being provided through each of the stationary and rotatable walls, said pair of openings communicating with an innermost passage formed with the innermost stationary and rotatable pipes; and a shaft extending through the innermost passage and the pair of shaft openings, said shaft being adapted to rotate a rotation element including the rotatable pipes and wall.

9. The rotatable multiple pipe coupling structure as claimed in claim 4, further comprising a pair of shaft openings, each being provided through each of the stationary and rotatable walls, said pair of openings communicating with an innermost passage formed with the innermost stationary and rotatable pipes; and a shaft extending through the innermost passage and the pair of shaft openings, said shaft being adapted to rotate a rotation element including the rotatable pipes and wall.

10. The rotatable multiple pipe coupling structure as claimed in claim 1, wherein said inner pipes are sealed with each other at the proximal end surfaces thereof by forming at least three concentric annular grooves in the proximal end surface of one of the inner pipes and three matching concentric annular grooves in the proximal end surface of the other inner pipe, and by slidably disposing an annular sealing ring within each of the outermost and innermost annular cavities formed respectively by the outermost grooves and the innermost grooves of the inner pipes; and the central annular cavity formed with the central grooves of the inner pipes being communicating with at least one vent opening provided through either one of the walls through a vent channel longitudinally extending within the wall of the respective inner pipe which is integral with the above wall.

11. The rotatable multiple pipe coupling structure as claimed in claim 10, wherein the central annular cavity formed by the central grooves of the inner pipes communicates with a vent opening provided through each of the walls through a vent channel longitudinally extending within the wall of each of the inner pipes.

12. The rotatable multiple coupling structure as claimed in claim 1, wherein said structure contains a plurality of inner stationary pipes and matching inner rotatable pipes thereby forming a plurality of concentric cylindrical channels, and the concentric cylindrical channels are alternately adapted as a vent channel.

13. The rotatable multiple coupling structure as claimed in claim 3, wherein said structure contains a plurality of inner stationary pipes and matching inner rotatable pipes thereby forming a plurality of concentric cylindrical channels, and the concentric cylindrical channels are alternately adapted as a vent channel.

14. The rotatable multiple coupling structure as claimed in claim 4, wherein said structure contains a plurality of inner stationary pipes and matching inner rotatable pipes thereby forming a plurality of concentric cylindrical channels, and the concentric cylindrical channels are alternately adapted as a vent channel.

15. The rotatable multiple coupling structure as claimed in claim 1, further comprising a pair of shaft openings, each being provided through each of the stationary and rotatable walls, said pair of openings communicating with an innermost passage formed with the innermost stationary and rotatable pipes; a shaft extending through the innermost passage and the pair of shaft openings, said shaft being adapted to rotate a rotatable element including the rotatable pipes and wall; said shaft being rotatably secured with a chassis by means of a main bearing; and said stationary wall being longitudinally and tolerably mounted on the chassis in such a manner that any shock which may be exerted onto the rotatable element be transmitted to the chassis via the shaft and the main bearing without exerting stress onto the rotatable multiple coupling structure.

16. The rotatable multiple coupling structure as claimed in claim 15 wherein said stationary wall is mounted on the chassis by means of at least two claws which are fixedly secured with the stationary wall and which engage their respective posts fixedly secured onto the chassis, each claw and its respective post having longitudinal tolerance greater than that between the main bearing of the shaft and the chassis.

* * * * *